Sept. 8, 1970  W. H. SCHWARTZ  3,526,931
INJECTION MOLDING MACHINE
Filed July 31, 1967

INVENTOR
WILLIAM H. SCHWARTZ

BY
Oberlin, Maky, Donnelly & Renner
ATTORNEYS

United States Patent Office 3,526,931
Patented Sept. 8, 1970

3,526,931
INJECTION MOLDING MACHINE
William H. Schwartz, University Heights, Ohio, assignor to Lester Engineering Company, Cleveland, Ohio, a corporation of Ohio
Filed July 31, 1967, Ser. No. 657,383
Int. Cl. B29f 1/02
U.S. Cl. 18—30                5 Claims

ABSTRACT OF THE DISCLOSURE

An injection molding machine of the reciprocating screw type characterized in that the screw may be serviced or replaced by rearward retraction from the injection cylinder and from the screw drive mechanism.

BACKGROUND OF THE INVENTION

For disclosure of a reciprocating screw injection molding machine reference may be had to William H. Schwartz, U.S. Pat. No. 3,335,461, granted Aug. 15, 1967 in which the feed screw, as is it rotated and axially retracted in an injection cylinder, melts the material therearound and feeds it to an injection chamber at the injection nozzle end of the cylinder wherefrom it is ejected upon axial advance of said feed screw. In said Schwartz machine, the injection assembly, after retraction from the mold, may be swung to a position such that upon removal of the nozzle assembly from the cylinder, the feed screw may be pulled out of the front end of the cylinder for servicing or replacement.

Such screw replacement or servicing, is somewhat of a time-consuming and difficult task in that the nozzle assembly must first be detached from the cylinder and then the rear end of the screw must be disconnected from its drive mechanism and initially pushed forwardly in the injection cylinder so that a suitable clamp means may be engaged with the forward end of the cylinder to pull it out of the forward end of the cylinder. When such machine is employed in molding thermosets, there may be opportunity for partial curing of the material in the injection chamber in the forward end of the cylinder, whereupon the task of forward removal of the screw may become even more difficult.

SUMMARY OF THE INVENTION

In view of the foregoing, it is a principal object of this invention to provide a novel mounting of the feed screw of a reciprocating screw injection molding machine so that the screw may be easily and quickly withdrawn from the rear of the injection cylinder and rearwardly through the screw drive mechanism.

It is another object of this invention to provide a novel form of screw actuating mechanism which lends itself to mounting of the screw for rearward withdrawal, this being achieved by keying the rear end of the feed screw to the rotary drive mechanism and by reciprocating the feed screw and the rotary drive mechanism as by means of power cylinders that straddle the feed screw and that are operatively connected between the feed box of the injection cylinder and the housing of the rotary drive mechanism.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

DISCUSSION OF THE INVENTION

Figure 1:
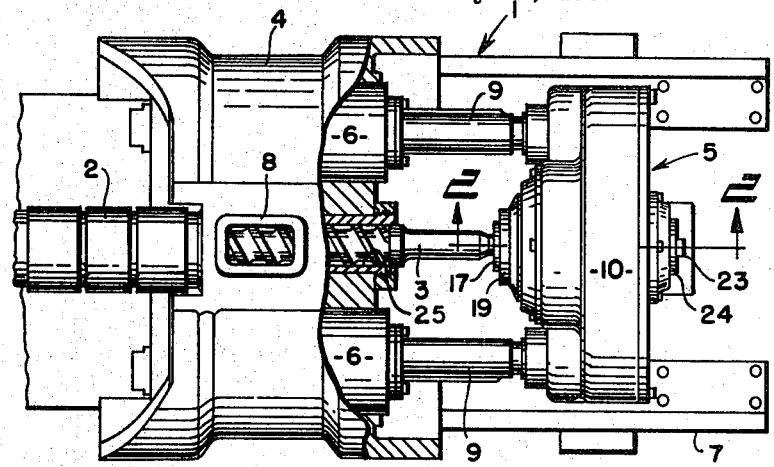
FIG. 1 is a top plan view partly in cross-section, illustrating a portion of a reciprocating screw injection molding machine embodying the present invention.

For purposes of illustration, FIG. 1 illustrates the rear portion 1 of a reciprocating screw injection molding machine, the front preferably being like that disclosed in the Schwartz Pat. 3,335,464, i.e., the front end of the injection cylinder 2 will be provided with a nozzle engageable with the sprue bushing of a stationary mold block. Said nozzle may be movable as disclosed in said Schwartz patent to be out of alignment with the sprue bushing when the feed screw 3 is rotated and axially retracted in the cylinder 2 to build up a charge of melted plastic in the chamber between the nozzle and the forward end of the feed screw 3. When the charge of melted plastic is sufficient to fill the mold, the nozzle is moved to a position in alignment with the sprue bushing, whereupon, when the feed screw 3 is advanced forwardly in the cylinder 2, it will act as a plunger to eject the melted plastic from said chamber through the nozzle and into the mold cavity.

To that end, the forward end of the feed screw 3 may be provided with a check valve as disclosed in said Schwartz Pat. 3,335,464 and as also disclosed in detail in the Schwartz Pat. 3,335,461, granted Aug. 15, 1967. Thus, the check valve permits flow of material from the feed screw 3 into the injection chamber when the screw is rotated and axially retracted. When the screw 3 is axially advanced in the cylinder 2 said check valve closes to prevent back flow of material, whereby the material in the injection chamber may be ejected under high pressure through the nozzle and into the mold cavity.

It is to be understood that the rear portion 1 of the machine, as shown in FIG. 1, may be mounted as in Schwartz Pat. No. 3,335,464, for bodily axial retraction of the cylinder 2, the feed box 4, the rotary drive mechanism 5, and the reciprocating mechanism 6 on the carrier frame 7 so that when the latter is swung on the base (not shown) of the machine about a vertical axis the nozzle end of the cylinder 2 will laterally clear the fixed mold block to provide access for nozzle servicing or for screw removal from the front end of the cylinder 2.

The feed box 4 has a feed opening 8 through which unmelted plastic material in the form of chips, pellets, granules, or powder (in the case of thermosets) may be fed for working by the feed screw 3 which extends forwardly into the cylinder 2. As evident, when the screw 3 is in its forward position, the rotation thereof will advance and work the plastic material toward the left into the aforesaid injection chamber between the nozzle and the forward end of the feed screw 3 and, as the pressure on the melted material in said chamber builds up, the screw 3 is forced rearwardly to the position shown in FIG. 1 or to a position short of the FIG. 1 position depending on the volume of plastic material which is desired to inject into the mold.

Straddling the feed screw 3 are hydraulic cylinders 6; 6 fixedly mounted in the feed box 4 and having their piston rods 9; 9 connected to the housing 10 of the rotary drive mechanism 5. As evident, when fluid under pressure is admitted into the rod ends of said cylinders 6; 6, the feed screw 3 and housing 10 will be advanced toward the left, as viewed in FIG. 1, to eject the plastic material in the front end of the cylinder 2 through the injection nozzle.

Figure 2:
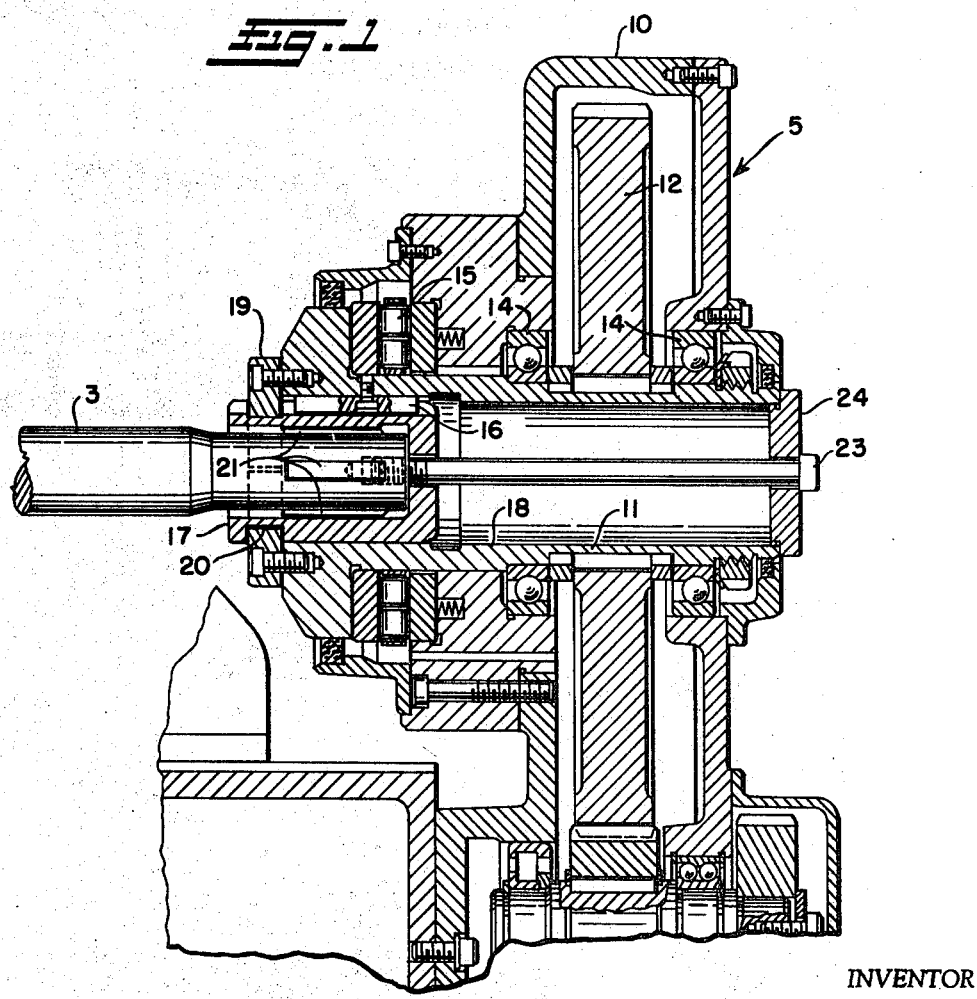
FIG. 2 is a cross-section view on enlarged scale taken substantially along the line 2—2, FIG. 1.

As best shown in FIG. 2, a tubular drive shaft 11 has keyed thereto a drive gear 12, said tubular drive shaft 11 being jourailed in said housing by radial bearings 14; 14 and a thrust bearing 15. Keyed as by means of key 16 the front end of the drive shaft 11 is a drive member 17 which is of diameter no greater than the bore 18 in the tubular drive shaft 11. Said drive member 17 is secured to the drive shaft 11 against axial movement as by means of the two part ring 19 of which the respective segments extend radially into a peripheral groove 20 in said drive member 17.

The rear end of the feed screw 3 is of reduced diameter as shown, and is keyed in the drive member 17 as by axial splines 21 which fit in corresponding axial keyways in the interior bore of the drive member 17. Furthermore, the rear end of the feed screw 3 has a threaded opening in which is engaged a bolt 23 having its head engaging a plate 24 abutting the rear end of the tubular drive shaft 11. As can be seen, when the bolt 23 is tightened, the rear end of the feed screw 3 is abutted against the bottom of the drive member 17 to impart rearward motion to the gear housing 10 through thrust bearing 15 during rotation of the screw 3 and to impart forward motion to the screw 3 through the thrust bearing 15 when the gear housing 10 is moved forward by actuation of cylinders 6; 6.

When it is desired to remove the feed screw 3 for servicing or replacement, all that need be done is to disengage the lock ring segments 19 from the groove 20 of the drive member 17, whereupon a suitable jack means or puller may be connected to the head of the bolt 23 or in the threaded end of the feed screw 3 to pull both the drive member 17 and the feed screw 3 rearwardly through the tubular drive shaft 11. Thus, when the machine is used for molding thermosets, if it becomes necessary to service or replace the feed screw 3, this can be easily and quickly done with minimum opportunity for hardening of the material in the injection chamber. As shown, the maximum diameter of the feed screw 3, which fits in cylinder bore 25, is such that it will pass the key 16 in drive shaft 11.

According to the teachings of the Schwartz Pat. No. 3,335,464, the feed screw 3 herein can also be removed from the front end of the cylinder 2 because there is no part of the feed screw which is larger in diameter than the cylinder bore 25. For front removal of the screw 3, the drive member 17 may be left in place in the tubular drive shaft 11 since the screw 3 may be pushed forwardly upon removal of bolt 23 and then pulled forwardly when the front end of the screw 3 projects beyond the front end of the cylinder 2.

Other modes of applying the principle of the invention may be employed, change being made as regards the details described, provided the features stated in any of the following claims, or the equivalent of such, be employed.

I therefore particularly point out and distinctly claim as my invention:

1. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises a reciprocable housing having a tubular drive shaft; a drive member keyed within said shaft and keyed on the rearward end of said feed screw for rotation of said feed screw responsive to rotation of said shaft; releasable retainer means axially retaining said feed screw, drive member, shaft, and housing together; said drive member and feed screw being removable rearwardly from said cylinder and through said shaft and housing upon release of said retainer means, said retainer means comprising a first member detachably connected to said feed screw and radially overlapping a rearwardly facing surface of said shaft, and a second member detachably connected to said shaft to radially overlap a forwardly facing surface of said shaft, said second member engaging said drive member to axially retain the latter in said shaft, said feed screw and drive member having abutting surfaces to prevent relative rearward movement of said feed screw with respect to said drive member, whereby upon release of said first and second members, a rearward pull exerted on said feed screw retracts the latter together with said drive member rearwardly through said drive shaft.

2. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises a reciprocable housing having a tubular drive shaft; a drive member keyed within said shaft and keyed on the rearward end of said feed screw for rotation of said feed screw responsive to rotation of said shaft; and releasable retainer means axially retaining said feed screw, drive member, shaft, and housing together; said drive member and feed screw being removable rearwardly from said cylinder and through said shaft and housing upon release of said retainer means, said retainer means including a member having detachable engagement with said feed screw and radially overlapping a rearwardly facing surface of said shaft whereby upon release of said member said feed screw may be forwardly removed from said drive member.

3. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises a reciprocable housing having a tubular drive shaft; a drive member keyed within said shaft and keyed on the rearward end of said feed screw for rotation of said feed screw responsive to rotation of said shaft; and releasable retainer means axially retaining said feed screw, drive member, shaft, and housing together; said driven member and feed screw being removable rearwardly from said cylinder and through said shaft and housing upon release of said retainer means, said retainer means including a member detachably connected to said shaft to radially overlap a forwardly facing surface of said shaft, said member further radially overlapping a rearwardly facing surface of said drive member and being radially outwardly disengageable from said drive member upon disconnection from said shaft whereby said drive member and feed screw may be rearwardly retracted through said tubular drive shaft.

4. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises a reciprocable housing having a tubular drive shaft; a drive member keyed within said shaft and keyed on the rearward end of said feed screw for rotation of said feed screw responsive to rotation of said shaft; and releasable retainer means axially retaining said feed screw, drive member, shaft, and housing together; said drive member and feed screw being removable rearwardly from said cylinder and through said shaft and housing upon release of said retainer means, said drive member being of diameter no greater than the diameter of the bore through said tubular drive shaft and having a longitudinally extending keyway through its front portion into which a key of said tubular drive shaft extends to enable such rearward retraction of said drive member through the bore of said tubular drive shaft; wherein said feed screw has a maximum diameter no greater than the minimum diameter to which said key extends; and wherein said retainer means comprises a transversely disposed retainer member which is detachably secured to the front portion of said tubular drive shaft and which extends radially into a peripheral groove in said drive member whereby, upon detachment and radial outward movement of said retainer member, said drive member and said feed screw may be rearwardly withdrawn through the bore of said tubular drive shaft.

5. In a reciprocating screw injection molding machine of the type in which rotation and axial retraction of a feed screw in a cylinder advances material into a chamber between the injection nozzle of said cylinder and the forward end of said feed screw, and in which axial advance of said feed screw in said cylinder ejects the material in said chamber through said nozzle, the improvement which comprises a reciprocable housing having a tubular drive shaft; a drive member keyed within said shaft and keyed on the rearward end of said feed screw for rotation of said feed screw responsive to rotation of said shaft; and releasable retainer means axially retaining said feed screw, drive member, shaft, and housing together; said drive member and feed screw being removable rearwardly from said cylinder and through said shaft and housing upon release of said retainer means, said drive member being of diameter no greater than the diameter of the bore through said tubular drive shaft and having a longitudinally extending keyway through its front portion into which a key of said tubular drive shaft extends to enable such rearward retraction of said drive member through the bore of said tubular drive shaft; wherein said feed screw has a maximum diameter no greater than the minimum diameter to which said key extends; and wherein said retainer means comprises a transversely disposed retainer member which is detachably secured to the front portion of said tubular drive shaft and which extends radially into a peripheral groove in said drive member whereby, upon detachment and radial outward movement of said retainer member, said drive member and said feed screw may be rearwardly withdrawn through the bore of said tubular drive shaft, said retainer means also comprising a member having threaded engagement with the rear end of said feed screw and radially overlapping a rearwardly facing surface of said tubular drive shaft thus to releasably retain said feed screw against forward movement of said feed screw with respect to said tubular drive shaft.

References Cited

UNITED STATES PATENTS

| | | | |
|---|---|---|---|
| 3,101,512 | 8/1963 | Goller | 18—30 |
| 3,349,439 | 10/1967 | Hehl | 18—30 |

FOREIGN PATENTS 909,449  10/1962  Great Britain.

J. SPENCER OVERHOLSER, Primary Examiner

M. O. SUTTON, Assistant Examiner